(12) United States Patent
Thoria et al.

(10) Patent No.: US 11,784,924 B2
(45) Date of Patent: Oct. 10, 2023

(54) OPTIMIZING APPLICATION PERFORMANCE IN HIERARCHICAL SD-WAN

(71) Applicant: Cisco Technology, Inc., San Jose, CA (US)

(72) Inventors: Samir Thoria, Saratoga, CA (US); Ram Dular Singh, Cupertino, CA (US); Praveen Raju Kariyanahalli, San Ramon, CA (US); Laxmikantha Reddy Ponnuru, Santa Clara, CA (US); Ramanathan Lakshmikanthan, Santa Clara, CA (US)

(73) Assignee: Cisco Technology, Inc., San Jose, CA (US)

(*) Notice: Subject to any disclaimer, the term of this patent is extended or adjusted under 35 U.S.C. 154(b) by 140 days.

(21) Appl. No.: 17/110,457

(22) Filed: Dec. 3, 2020

(65) Prior Publication Data

US 2022/0182317 A1  Jun. 9, 2022

(51) Int. Cl.
*H04L 45/50* (2022.01)
*H04L 45/00* (2022.01)
*H04L 45/02* (2022.01)
*H04L 12/46* (2006.01)

(52) U.S. Cl.
CPC .......... *H04L 45/50* (2013.01); *H04L 12/4641* (2013.01); *H04L 45/04* (2013.01); *H04L 45/22* (2013.01)

(58) Field of Classification Search
None
See application file for complete search history.

(56) References Cited

U.S. PATENT DOCUMENTS

| | | | |
|---|---|---|---|
| 7,664,877 B1 * | 2/2010 | Sheth | H04L 45/507 709/242 |
| 8,249,057 B1 * | 8/2012 | Mohaban | H04L 65/1083 370/395.5 |
| 9,178,801 B1 * | 11/2015 | Guichard | H04L 45/22 |
| 9,923,798 B1 * | 3/2018 | Bahadur | H04L 45/00 |
| 2016/0080502 A1 * | 3/2016 | Yadav | H04L 45/28 709/227 |
| 2016/0255542 A1 | 9/2016 | Hughes et al. | |
| 2017/0346722 A1 | 11/2017 | Smith et al. | |

(Continued)

OTHER PUBLICATIONS

RFC 8402 "Segment Routing Architecture", Jul. 2018 (Year: 2018).*

(Continued)

*Primary Examiner* — Jenkey Van
(74) *Attorney, Agent, or Firm* — Polsinelli

(57) ABSTRACT

Systems and methods are provided for receiving bandwidth metrics from a plurality of routers on respective link routes in a network, compiling a link database including the bandwidth metrics of each respective link route in the network, selecting a first designated link path from the link database between a first router and a second router based on an application routing policy, the application routing policy being based on a routing metric, providing a first multiprotocol label switching label based on the first designated link path to the first router of the plurality of routers in the network, and restricting network traffic of the first router to the first designated link path provided in the first multiprotocol label switching label.

20 Claims, 11 Drawing Sheets

(56) References Cited

U.S. PATENT DOCUMENTS

2019/0319872 A1    10/2019   Adhikari et al.
2020/0084137 A1     3/2020   Bernardi et al.
2020/0366589 A1*  11/2020   Kaplan .................. H04L 45/02

OTHER PUBLICATIONS

"Policies Configuration Guide for Vedge Routers, Cisco SD-WAN Releases 19.1, 19.2, and 19.3," Jul. 3, 2019, Cisco Systems, Inc., pp. 1-266.

* cited by examiner

OPTIMIZING APPLICATION PERFORMANCE IN HIERARCHICAL SD-WAN

TECHNICAL FIELD

The subject matter of this disclosure relates in general to the field of computer networking, and more particularly, to systems and methods for optimizing application performance in a hierarchical software-defined networking in a wide area network (SD-WAN).

BACKGROUND

The enterprise network landscape is continuously evolving. There is a greater demand for mobile and Internet of Things (IoT) device traffic, Software as a Service (SaaS) applications, and cloud adoption. In addition, security needs are increasing and certain applications can require prioritization and optimization for proper operation. As this complexity grows, there is a push to reduce costs and operating expenses while providing for high availability and scale.

Conventional WAN architectures are facing major challenges under this evolving landscape. Conventional WAN architectures typically consist of multiple Multi-Protocol Label Switching (MPLS) transports, or MPLS paired with Internet or Long-Term Evolution (LTE) links used in an active/backup fashion, most often with Internet or SaaS traffic being backhauled to a central data center or regional hub for Internet access. Issues with these architectures can include insufficient bandwidth, high bandwidth costs, application downtime, poor SaaS performance, complex operations, complex workflows for cloud connectivity, long deployment times and policy changes, limited application visibility, and difficulty in securing the network.

Moreover, overlay models can be utilized for software-defined networking in a wide area network (SD-WAN), which can include: 1) overlay tunnels that directly connect SD-WAN edge routers; and 2) overlay tunnels that "hop-by-hop" between SD-WAN edge routers and intermediate SD-WAN routers that is also known as hierarchical SD-WAN. Some examples of a hierarchical SD-WAN network include hub and spoke topology and a multi-region SD-WAN network that is connected over a common middle mile/core.

BRIEF DESCRIPTION OF THE FIGURES

To provide a more complete understanding of the present disclosure and features and advantages thereof, reference is made to the following description, taken in conjunction with the accompanying drawings, in which.

DESCRIPTION OF EXAMPLE EMBODIMENTS

Figure 1A:
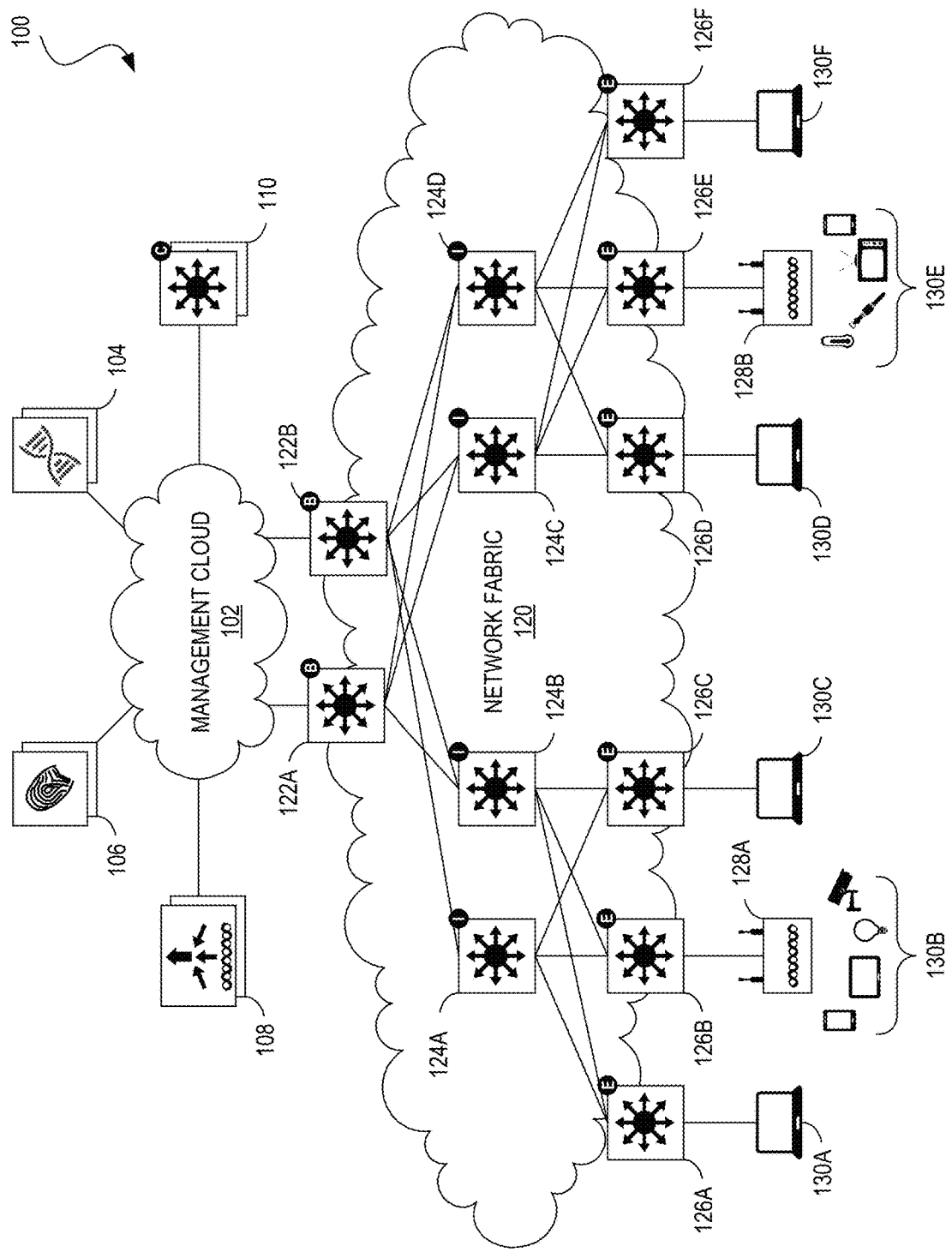
FIG. 1A illustrates an example of a physical topology for an enterprise network, in accordance with an embodiment of the present disclosure.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Systems and methods provide optimizing application performance in a hierarchical software-defined networking in a wide area network. For example, systems and methods are provided for receiving bandwidth metrics from a plurality of routers on respective link routes in a network, compiling a link database including the performance metrics of each respective link in the network, selecting a first designated link path from the link database between a first router and a second router based on an application routing policy, the application routing policy being based on a routing metric, providing a first multiprotocol label switching label based on the first designated link path to the first router of the plurality of routers in the network, and restricting network traffic of the first router to the first designated link path provided in the first multiprotocol label switching label.

EXAMPLE EMBODIMENTS

An example of a network architecture for implementing aspects of the present technology is described below. However, one of ordinary skill in the art will understand that, for the network architecture and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

Enterprise networks can be designed and deployed to provide wireless network access for general-purpose computing devices (e.g., servers, workstations, desktop computers, laptop computers, tablets, mobile phones, etc.) and things (e.g., desk phones, security cameras, lighting, HVAC, windows, doors, locks, medical devices, industrial and manufacturing equipment, and other IoT devices) (sometimes also referred to as clients, servers, hosts, computing systems, endpoints, electronic devices, user devices, User Equipment (UE) devices, etc.) within environments such as offices, hospitals, colleges and universities, oil and gas facilities, factories, and similar locations. With wireless network access, these devices can connect to private networks (e.g., campus or access networks, data centers, branch networks, etc.) and public networks (e.g., the Internet, Infrastructure as a Service (IaaS) networks, Platform as a Service (PaaS) networks, Software as a Service (SaaS) networks, other Cloud Service Provider (CSP) networks, etc.) without being tethered to a specific location. The wireless network access technologies can include Wireless Personal Area Networks (WPANs) (e.g., BLUETOOTH, ZIGBEE, Z-WAVE, etc.), WI-FI (e.g., Institute of Electrical Electronic Engineers (IEEE) 802.11x, such as 802.11a, 802.11h, 802.11g, 802.11n, 802.11ac, 802.11ax, etc.) or Wireless Local Area Networks (WLANs), and Wireless Wide Area Networks (WWANs) or cellular networks (e.g., 4G/LTE, 5G, etc.).

Another wireless network access technology that can be integrated by enterprise networks is Citizens Broadband Radio Service (CBRS) (sometimes also referred to as private LTE, private 5G, OnGo, etc.). CBRS operates in a 210 MHz wide spectrum of the 3.5 GHz band (e.g., 3550-3700 MHz frequency range in the United States), and thus CBRS is unlikely to interfere or be interfered with by WI-FI and cellular devices. For some devices, like life-sustaining medical equipment that need guaranteed, always-on connectivity or industrial IoT devices or other robots that have specific mobility requirements, CBRS can complement WI-FI, cellular, and other wireless networks.

WI-FI, cellular, and CBRS networks have different advantages and drawbacks relative to one another. Building a cellular network to provide ubiquitous, robust connectivity (e.g., backhaul links cannot be cut, cellular network infrastructure is often restored first after a disaster, etc.) to devices operating across vast distances can be a costly endeavor that relies on monthly and metered subscriptions to cover expenses. WI-FI network equipment can connect devices within the same general physical location, such as a home or a building, and is relatively inexpensive in comparison. In addition, WI-FI operates in unlicensed frequencies that do not require bidding for rights to use them. Mobile and cellular standards are also different from WI-FI in that a cellular device can require a significantly higher license cost for the technology itself. For example, WI-FI devices, which are based on IEEE standards, can have a per-device cost for associated licenses that is dramatically lower than for LTE/4G or 5G devices.

Cellular networks may be suitable for mobile usage in cases in which it can be critical for a user to have a consistent, persistent connection. For example, a mobile user may walk from place to place while making a phone call, answer email from a bus, or stream a podcast while driving, and so on. These may be situations in which the user may be intolerant of gaps in network coverage. The mobile user is also unlikely to consume a lot of data under these circumstances. WI-FI and CBRS networks, on the other hand, may be particularly suitable for nomadic usage where it can be more important to have a stable connection (e.g., relatively more tolerant of coverage gaps) and to be able to consume large amounts of data at little to no cost. For example, a nomadic user can decamp from place to place but may sit down for extended periods of time to do data-intensive work, such as receiving large files, editing them, and sending them back online. The same users, on the same devices, can be mobile users or nomadic users at different periods of times, and network operators are beginning to incorporate WI-FI, cellular, and CBRS network infrastructure into their own networks for increased flexibility, availability, and capacity, among other benefits. However, it can be challenging to manage these separate access technologies as integrated systems with unified policy, security, and analytics in view of the differences among them in terms of cost, infrastructure layout, the level of administrative control they can provide, and the like. Users and devices need to move between these different wireless systems, and network operators want the experience to be seamless and easy to manage at scale.

Turning now to the drawings, FIG. 1A illustrates an example of an enterprise network 100. It should be understood that, for the enterprise network 100 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the enterprise network 100 can include any number or type of resources, which can be accessed and utilized by endpoints or network devices. The illustrations and examples provided herein are for clarity and simplicity.

In this example, the enterprise network 100 includes a management cloud 102 and a network fabric 120. Although shown as an external network or cloud to the network fabric 120 in this example, the management cloud 102 may alternatively or additionally reside on the premises of an organization or in a colocation center (in addition to being hosted by a cloud provider or similar environment). The management cloud 102 can provide a central management plane for building and operating the network fabric 120. The management cloud 102 can be responsible for forwarding configuration and policy distribution, as well as device management and analytics. The management cloud 102 can comprise one or more network controller appliances 104, one or more AAA appliances 106, wireless network infrastructure equipment 108 (e.g., WLCs, EPC equipment, 4G/LTE or 5G Core network equipment, etc.), and one or more fabric control plane nodes 110. In other embodiments, one or more elements of the management cloud 102 may be co-located with the network fabric 120.

The network controller appliances 104 can function as the command and control system for one or more network fabrics, and can house automated workflows for deploying and managing the network fabrics. The network controller appliances 104 can include automation, design, policy, provisioning, and assurance capabilities, among others, as discussed further below with respect to FIG. 2. In some embodiments, one or more Cisco Digital Network Architecture (Cisco DNA™) appliances can operate as the network controller appliances 104.

The AAA appliances 106 can control access to computing resources, facilitate enforcement of network policies, audit usage, and provide information necessary to bill for services. The AAA appliance can interact with the network controller appliances 104 and with databases and directories containing information for users, devices, things, policies, billing, and similar information to provide authentication, authorization, and accounting services. In some embodiments, the AAA appliances 106 can utilize Remote Authentication Dial-In User Service (RADIUS) or Diameter to communicate with devices and applications. In some embodiments, one or more Cisco® Identity Services Engine (ISE) appliances can operate as the AAA appliances 106.

The wireless network infrastructure equipment 108 can support fabric-enabled base stations and access points attached to the network fabric 120, handling traditional tasks associated with a WLC or 4G/LTE or 5G Core network equipment as well as interactions with the fabric control plane for wireless endpoint registration and roaming. In some embodiments, the network fabric 120 can implement a wireless deployment that moves data-plane termination (e.g., Virtual Extensible Local Area Network (VXLAN)) from a centralized location (e.g., with previous overlay Control and Provisioning of Wireless Access Points (CAPWAP) deployments) to a wireless base station or access point/fabric edge node. This can enable distributed forwarding and distributed policy application for wireless traffic while retaining the benefits of centralized provisioning and administration. In some embodiments, one or more Cisco® Catalyst® controllers, Cisco® Wireless Controllers, Cisco® Wireless Local Area Network (LAN), and/or other Cisco DNA™-ready wireless controllers can operate as the wireless network infrastructure equipment 108.

The network fabric 120 can comprise fabric border nodes 122A and 122B (collectively, 122), fabric intermediate nodes 124A-D (collectively, 124), and fabric edge nodes 126A-F (collectively, 126). Although the fabric control plane nodes 110 are shown to be external to the network fabric 120 in this example, in other embodiments, the fabric control plane nodes 110 may be co-located with the network fabric 120. In embodiments where the fabric control plane nodes 110 are co-located with the network fabric 120, the fabric control plane nodes 110 may comprise a dedicated node or set of nodes or the functionality of the fabric control nodes 110 may be implemented by the fabric border nodes 122.

The fabric control plane nodes 110 can serve as a central database for tracking all users, devices, and things as they attach to the network fabric 120, and as they roam around. The fabric control plane nodes 110 can allow network infrastructure (e.g., switches, routers, WLCs, etc.) to query the database to determine the locations of users, devices, and things attached to the fabric instead of using a flood and learn mechanism. In this manner, the fabric control plane nodes 110 can operate as a single source of truth about where every endpoint attached to the network fabric 120 is located at any point in time. In addition to tracking specific endpoints (e.g., /32 address for IPv4, /128 address for IPv6, etc.), the fabric control plane nodes 110 can also track larger summarized routers (e.g., IP/mask). This flexibility can help in summarization across fabric sites and improve overall scalability.

The fabric border nodes 122 can connect the network fabric 120 to traditional Layer 3 networks (e.g., non-fabric networks) or to different fabric sites. The fabric border nodes 122 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 122 can also exchange reachability and policy information with fabric control plane nodes of different fabric sites. The fabric border nodes 122 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 124 can operate as pure Layer 3 forwarders that connect the fabric border nodes 122 to the fabric edge nodes 126 and provide the Layer 3 underlay for fabric overlay traffic.

The fabric edge nodes 126 can connect endpoints to the network fabric 120 and can encapsulate/decapsulate and forward traffic from these endpoints to and from the network fabric. The fabric edge nodes 126 may operate at the perimeter of the network fabric 120 and can be the first points for attachment of users, devices, and things and the implementation of policy. In some embodiments, the network fabric 120 can also include fabric extended nodes (not shown) for attaching downstream non-fabric Layer 2 network devices to the network fabric 120 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 126 for communication to outside subnets.

In some embodiments, all subnets hosted in a fabric site can be provisioned across every fabric edge node 126 in that fabric site. For example, if the subnet 10.10.10.0/24 is provisioned in a given fabric site, this subnet may be defined across all of the fabric edge nodes 126 in that fabric site, and endpoints located in that subnet can be placed on any fabric edge node 126 in that fabric. This can simplify IP address management and allow deployment of fewer but larger subnets. In some embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-Ready™ devices can operate as the fabric nodes 122, 124, and 126.

The enterprise network 100 can also include wired endpoints 130A, 130C, 130D, and 130F and wireless endpoints 130B and 130E (collectively, 130). The wired endpoints 130A, 130C, 130D, and 130F can connect by wire to fabric edge nodes 126A, 126C, 126D, and 126F, respectively, and the wireless endpoints 130B and 130E can connect wirelessly to wireless base stations and access points 128B and 128E (collectively, 128), respectively, which in turn can connect by wire to fabric edge nodes 126B and 126E, respectively. In some embodiments, Cisco® Catalyst® access points, Cisco Aironet® access points, Cisco Meraki® MR access points, and/or other Cisco DNA™-ready access points can operate as the wireless base stations and access points 128.

The endpoints 130 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 130 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some embodiments, the network fabric 120 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the wireless network infrastructure equipment 108 notifying the fabric control plane nodes 110 of joins, roams, and disconnects by the wireless endpoints 130 such that the fabric control plane nodes can have connectivity information about both wired and wireless endpoints in the network fabric 120, and can serve as the single source of truth for endpoints connected to the network fabric. For data plane integration, the wireless network infrastructure equipment 108 can instruct the fabric wireless base stations and access points 128 to form a VXLAN overlay tunnel to their adjacent fabric edge nodes 126. The VXLAN tunnel can carry segmentation and policy information to and from the fabric edge nodes 126, allowing connectivity and functionality identical or similar to that of a wired endpoint. When the wireless endpoints 130 join the network fabric 120 via the fabric wireless base stations and access points 128, the wireless network infrastructure equipment 108 can onboard the endpoints into the network fabric 120 and inform the fabric control plane nodes 110 of the endpoints' Media Access Control (MAC) addresses (or other identifiers). The wireless network infrastructure equipment 108 can then instruct the fabric wireless base stations and access points 128 to form VXLAN overlay tunnels to the adjacent fabric edge nodes 126. Next, the wireless endpoints 130 can obtain IP addresses for themselves via Dynamic Host Configuration Protocol (DHCP). Once that completes, the fabric edge nodes 126 can register the IP addresses of the wireless endpoint 130 to the fabric control plane nodes 110 to form a mapping between the endpoints' MAC and IP addresses, and traffic to and from the wireless endpoints 130 can begin to flow.

Figure 1B:
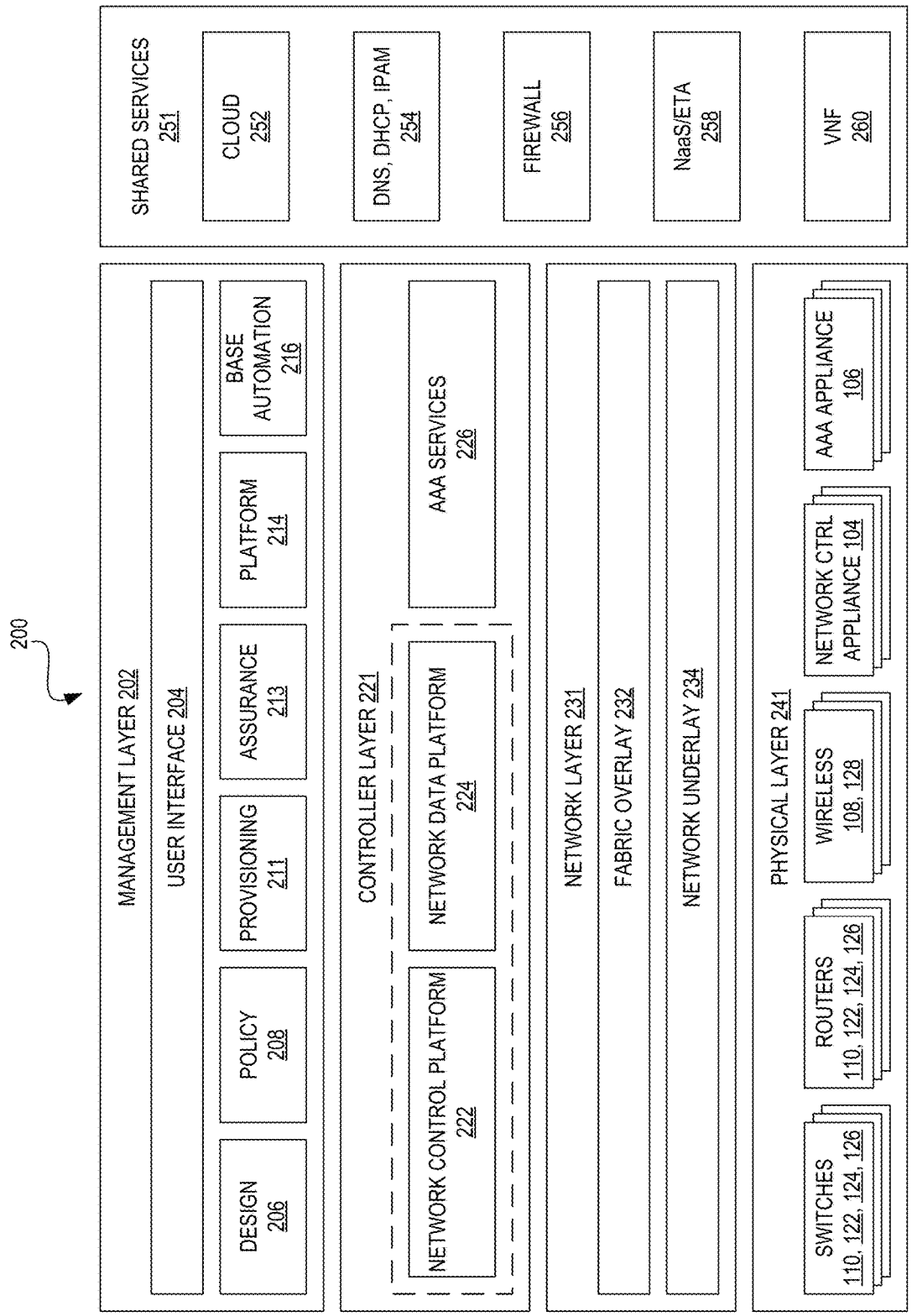
FIG. 1B illustrates an example of a logical architecture for an enterprise network, such as the enterprise network of FIG. 1A, in accordance with an embodiment of the present disclosure.

FIG. 1B illustrates an example of a software architecture or logical architecture 200 for an enterprise network. One of ordinary skill in the art will understand that, for the logical architecture 200 and any system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure. In this example, the logical architecture 200 includes a management layer 202, a controller layer 221, a network layer 231, the physical layer 241, and a shared services layer 251.

The management layer 202 can abstract the complexities and dependencies of other layers and provide a user with tools and workflows to manage an enterprise network (e.g., the enterprise network 100). The management layer 202 can include a user interface 204, design functions 206, policy functions 208, provisioning functions 211, assurance functions 213, platform functions 214, and base automation functions. The user interface 204 can provide a user a single point to manage and automate the network. The user interface 204 can be implemented within a web application/web server accessible by a web browser and/or an application/application server accessible by a desktop application, a mobile app, a shell program or other command line interface (CLI), an Application Programming Interface (e.g., restful state transfer (REST), Simple Object Access Protocol (SOAP), Service Oriented Architecture (SOA), etc.), and/or other suitable interface in which the user can configure network infrastructure, devices, and things that are cloud-managed; provide user preferences; specify policies, enter data; review statistics; configure interactions or operations; and so forth. The user interface 204 may also provide visibility information, such as views of a network, network infrastructure, computing devices, and things. For example, the user interface 204 can provide a view of the status or conditions of the network, the operations taking place, services, performance, a topology or layout, protocols implemented, running processes, errors, notifications, alerts, network structure, ongoing communications, data analysis, and so forth.

The design functions 206 can include tools and workflows for managing site profiles, maps and floor plans, network settings, and IP address management, among others. The policy functions 208 can include tools and workflows for defining and managing network policies. The provisioning functions 211 can include tools and workflows for deploying the network. The assurance functions 213 can use machine learning and analytics to provide end-to-end visibility of the network by learning from the network infrastructure, endpoints, and other contextual sources of information. The platform functions 214 can include tools and workflows for integrating the network management system with other technologies. The base automation functions can include tools and workflows to support the policy functions 208, the provisioning functions 211, the assurance functions 213, and the platform functions 214.

In some embodiments, the design functions 206, the policy functions 208, the provisioning functions 211, the assurance functions 213, the platform functions 214, and the base automation functions can be implemented as microservices in which respective software functions are implemented in multiple containers communicating with each rather than amalgamating all tools and workflows into a single software binary. Each of the design functions 206, policy functions 208, provisioning functions 211, assurance functions 213, and platform functions 214 can be viewed as a set of related automation microservices to cover the design, policy authoring, provisioning, assurance, and cross-platform integration phases of the network lifecycle. The base automation functions can support the top-level functions by allowing users to perform certain network-wide tasks.

The controller layer 221 can comprise subsystems for the management layer 202 and may include a network control platform 222, a network data platform 224, and AAA services 226. These controller subsystems can form an abstraction layer to hide the complexities and dependencies of managing many network devices and protocols.

The network control platform 222 can provide automation and orchestration services for the network layer 231 and the physical layer 241, and can include the settings, protocols, and tables to automate management of the network and physical layers. For example, the network control platform 222 can provide the design functions 206, the policy functions 208, the provisioning functions 211, and the platform functions 214. In addition, the network control platform 222 can include tools and workflows for discovering switches, routers, wireless controllers, and other network devices (e.g., the network discovery tool); maintaining network and endpoint details, configurations, and software versions (e.g., the inventory management tool); Plug-and-Play (PnP) for automating deployment of network infrastructure (e.g., the network PnP tool), Path Trace for creating visual data paths to accelerate the troubleshooting of connectivity problems, Easy QoS for automating quality of service to prioritize applications across the network, and Enterprise Service Automation (ESA) for automating deployment of physical and virtual network services, among others. The network control platform 222 can communicate with network devices using Network Configuration (NETCONF)/Yet Another Next Generation (YANG), Simple Network Management Protocol (SNMP), Secure Shell (SSH)/Telnet, and so forth. In some embodiments, the Cisco® Network Control Platform (NCP) can operate as the network control platform 222.

The network data platform 224 can provide for network data collection, analytics, and assurance, and may include the settings, protocols, and tables to monitor and analyze network infrastructure and endpoints connected to the network. The network data platform 224 can collect multiple types of information from network devices, including System Logging Protocol ("syslog"), SNMP, NetFlow, Switched Port Analyzer (SPAN), and streaming telemetry, among others. The network data platform 224 can also collect use contextual information shared from the network devices. Syslog is a protocol that can be used to send system log or event messages to a server (e.g., a syslog server). The syslog can collect logs from various devices to monitor and review data.

In some embodiments, one or more Cisco DNA™ Center appliances can provide the functionalities of the management layer 202, the network control platform 222, and the network data platform 224. The Cisco DNA™ Center appliances can support horizontal scalability by adding additional Cisco DNA™ Center nodes to an existing cluster; high availability for both hardware components and software packages; backup and store mechanisms to support disaster discovery scenarios; role-based access control mechanisms for differentiated access to users, devices, and things based on roles and scope; and programmable interfaces to enable integration with third party vendors. The Cisco DNA™ Center appliances can also be cloud-tethered to provide for the upgrade of existing functions and additions of new packages and applications without having to manually download and install them.

The AAA services 226 can provide identity and policy services for the network layer 231 and physical layer 241, and may include the settings, protocols, and tables to support endpoint identification and policy enforcement services. The AAA services 226 can provide tools and workflows to manage virtual networks and security groups, and to create group-based policies and contracts. The AAA services 226 can identify and profile network devices and endpoints using AAA/RADIUS, 802.1X, MAC Authentication Bypass (MAB), web authentication, and EasyConnect, among others. The AAA services 226 can also collect and use contextual information from the network control platform 222, the network data platform 224, and the shared services layer 251, among others. In some embodiments, Cisco® ISE can provide the AAA services 226.

The network layer 231 can be conceptualized as a composition of two layers, an underlay 234 comprising physical and virtual network infrastructure (e.g., routers, switches, WLCs, etc.) and a Layer 3 routing protocol for forwarding traffic, and an overlay 232 comprising a virtual topology for logically connecting wired and wireless users, devices, and things and applying services and policies to these entities. Network devices of the underlay 234 can establish connectivity between each other, such as via IP. The underlay may use any topology and routing protocol.

In some embodiments, the network controller appliances 104 can provide a local area network (LAN) automation service, such as implemented by Cisco DNA™ Center LAN Automation, to automatically discover, provision, and deploy network devices. Once discovered, the automated underlay provisioning service can leverage Plug and Play (PnP) to apply the required protocol and network address configurations to the physical network infrastructure. In some embodiments, the LAN automation service may implement the Intermediate System to Intermediate System (IS-IS) protocol. Some of the advantages of IS-IS include neighbor establishment without IP protocol dependencies, peering capability using loopback addresses, and agnostic treatment of IPv4, IPv6, and non-IP traffic.

The overlay 232 can be a logical, virtualized topology built on top of the physical underlay 234, and can include a fabric data plane, a fabric control plane, and a fabric policy plane. In some embodiments, the fabric data plane can be created via packet encapsulation using Virtual Extensible LAN (VXLAN) with Group Policy Option (GPO). Some of the advantages of VXLAN-GPO include its support for both Layer 2 and Layer 3 virtual topologies (overlays), and its ability to operate over any IP network with built-in network segmentation.

In some embodiments, the fabric control plane can implement Locator/Identifier Separation Protocol (LISP) for logically mapping and resolving users, devices, and things. LISP can simplify routing by removing the need for each router to process every possible IP destination address and route. LISP can achieve this by moving remote destination to a centralized map database that allows each router to manage only its local routs and query the map system to locate destination endpoints.

The fabric policy plane is where intent can be translated into network policy. That is, the policy plane is where the network operator can instantiate logical network policy based on services offered by the network fabric 120, such as security segmentation services, QoS, capture/copy services, application visibility services, and so forth.

Segmentation is a method or technology used to separate specific groups of users or devices from other groups for the purpose of reducing congestion, improving security, containing network problems, controlling access, and so forth. As discussed, the fabric data plane can implement VXLAN encapsulation to provide network segmentation by using the virtual network identifier (VNID) and Scalable Group Tag (SGT) fields in packet headers. The network fabric 120 can support both macro-segmentation and micro-segmentation.

Macro-segmentation logically separates a network topology into smaller virtual networks by using a unique network identifier and separate forwarding tables. This can be instantiated as a Virtual Routing and Forwarding (VRF) instance and referred to as a Virtual Network (VN). That is, a VN is a logical network instance within the network fabric 120 defined by a Layer 3 routing domain and can provide both Layer 2 and Layer 3 services (using the VNID to provide both Layer 2 and Layer 3 segmentation). Micro-segmentation logically separates user or device groups within a VN, by enforcing source to destination access control permissions, such as by using access control lists (ACLs). A scalable group is a logical object identifier assigned to a group of users, devices, or things in the network fabric 120. It can be used as source and destination classifiers in Security Group ACLs (SGACLs). The SGT can be used to provide address-agnostic group-based policies.

In some embodiments, the fabric control plane node 110 may implement the Locator/Identifier Separation Protocol (LISP) to communicate with one another and with the management cloud 102. Thus, the control plane nodes may operate a host tracking database, a map server, and a map resolver. The host tracking database can track the endpoints 130 connected to the network fabric 120 and associate the endpoints to the fabric edge nodes 126, thereby decoupling an endpoint's identifier (e.g., IP or MAC address) from its location (e.g., closest router) in the network.

The physical layer 241 can comprise various network devices, such as the switches and routers 110, 122, 124, and 126, the wireless network infrastructure equipment 108, the wireless base stations and access points 128, the network controller appliances 104, and the AAA appliances 106, among others.

The shared services layer 251 can provide an interface to external network services, such as cloud services 252; Domain Name System (DNS), DHCP, IP Address Management (IPAM), and other network address management services 254; firewall services 256; Network as a Sensor (NaaS)/Encrypted Threat Analytics (ETA) services 258; and Virtual Network Functions (VNFs) 260; among others. The management layer 202 and/or the controller layer 221 can share identity, policy, forwarding information, and so forth via the shared services layer 251 using APIs.

Figure 2:
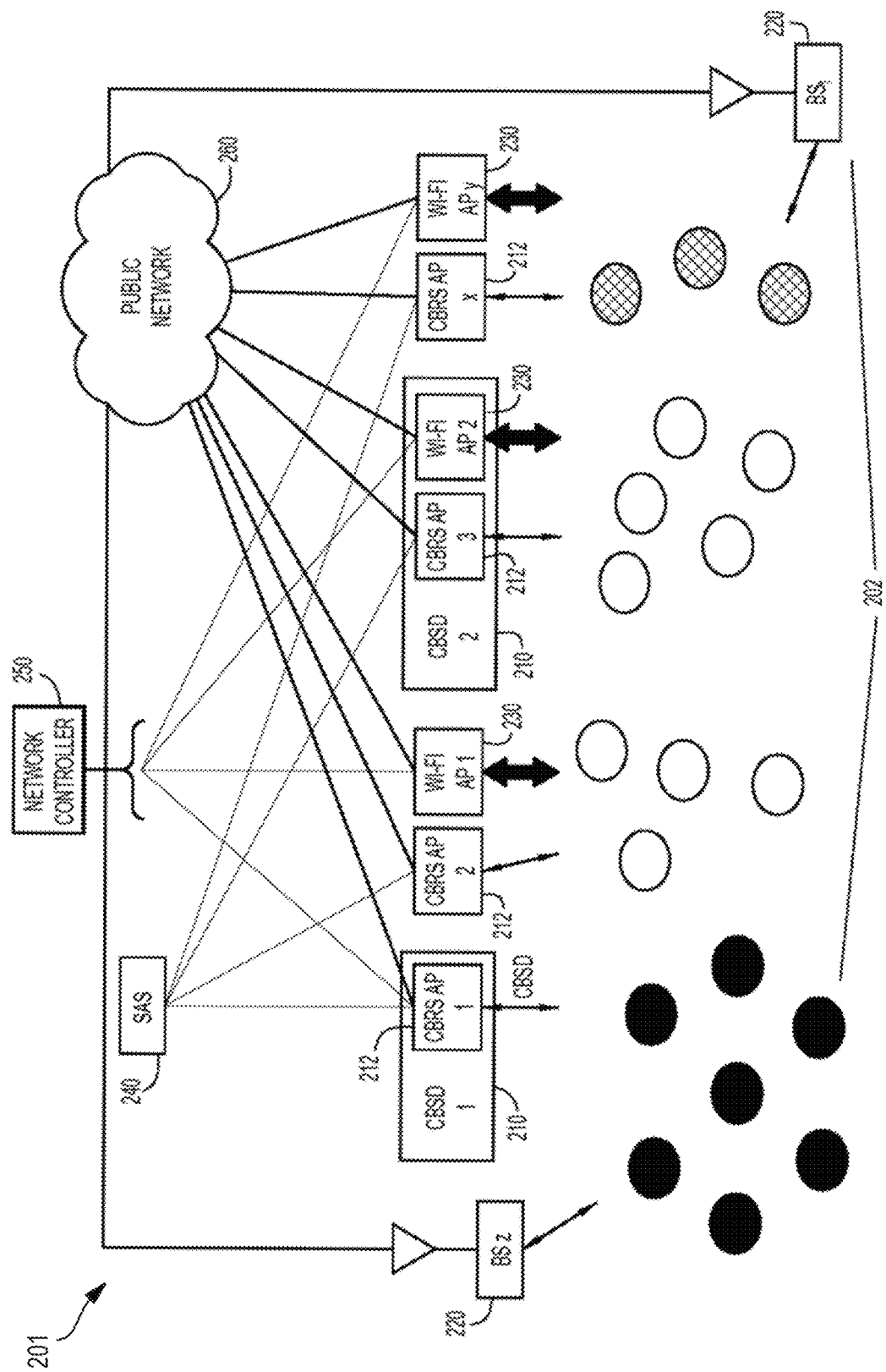
FIG. 2 illustrates an example of a heterogeneous wireless network, in accordance with an embodiment of the present disclosure.

FIG. 2 illustrates of an example of a heterogeneous wireless network 201, such as a network capable of providing User Equipment (UE) devices network access via a Wi-Fi network, cellular network, CBRS, and/or other radio network. In this example, the heterogeneous wireless network 201 includes User Equipment (UE) devices 203 (shown as circles), CBRS Devices (CBSDs) 210 (e.g., CBSD1 and CBSD2), CBRS APs 212 (e.g., CBRS AP 1, 2, . . . , x), base stations 220 (e.g., BS1, Bz) of a public radio network, Wi-Fi access points 230 (e.g., Wi-Fi AP1, 2, . . . , y), a Spectrum Access System (SAS) 240, a network controller 250, and a public IP network 260. Some of the CBSDs 210 may include CBRS APs 212. The CBSDs 210, BSs 220, and Wi-Fi APs 230 can connect the UE devices 203 to the public IP network 260. The public IP network 260 may include a public data network, such as the Internet.

In FIG. 2, at least some of the UE devices 203 may be CBRS-enabled such that they can connect to the public IP network 260 via a CBRS network. For example, the UE devices 203 can attach to a CBRS network comprising the CBRS APs 212. Some of the CBRS APs 212 may be standalone devices, such as the CBRS AP 2 and CBRS AP x, while others can be integrated with other components and are part of another device such as is the case for the CBRS AP 1 and CBRS AP 3 in which the CBRS AP 1 is part of the CBSD 1 and CBRS AP 3 is part of the CBSD 2.

The CBSD 1 may also include a controller (not shown). A CBSD that includes a controller can be an evolved NodeB (eNodeB), defined in a Universal Mobile Telecommunications System (UMTS) standard. The CBSD 2 may be an integrated AP device that includes the CBRS AP 3 and also the Wi-Fi AP 2.

The SAS 240 can operate as a controller for the CBSDs 210 and the CBRS APs 212. The SAS 240 can manage the CBRS spectrum and maintain a database of spectrum usage by all users, including Tier 1 users, Tier 2 users, and Tier 3 users (as shown in Table 1), in all census tracts or areas. The SAS 240 can allocate channels to the CBRS APs 212 using a variety of rules. For example, the SAS 240 can consider multiple factors and inform the CBRS APs 212 and the CBSDs 210 of the operating parameters including allocated frequency band, allocated channel, and/or maximum effective isotropic radiated power that can be used at a given point in time. The SAS 240 can also provide the FCC required 300 second notification that an enterprise (e.g., a Tier 3 or GAA user) needs to offload its UE devices 203 from the CBRS network.

When the enterprise is forced to offload its UE devices 203, the UE devices 203 may be offloaded to a cellular network provided via the BSs 220 or to a Wi-Fi network provided via the Wi-Fi APs 230. In FIG. 2, based on the 300 second notification provided by the SAS 240 to the CBSD 1, a set of UE devices 203 attached to the CBRS AP 1 (shaded circles) may be offloaded from the CBRS AP 1 to the BSz, as an example. The set of the UE devices 203 can continue to obtain access to the public IP network 260 via the BSz and are offloaded from the CBRS network. According to another example embodiment, another set of the UE devices 203 (e.g., cross hatched circles) may be offloaded to a Wi-Fi network provided via the Wi-Fi AP y.

The Wi-Fi APs 230 can be managed and controlled by the network controller 250. The network controller 250 may include a WLC. In one example embodiment, the network controller 250 may also include an interworking function (IWK) to manage the CBRS APs 212 or operate as a controller for at least some of the CBRS APs 212. The network controller 250 may generate policies and push the policies to various access points for execution. For example, the network controller 250 may run analytics to develop CBRS offloading policies. It is also possible, however, some or all of the functions of the network controller 250 may be implemented within one or more of the CBSDs 210 or the CBRS APs 212.

Moreover, overlay models can be utilized for software-defined networking in a wide area network (SD-WAN), which can include: 1) overlay tunnels that directly connect SD-WAN edge routers; and 2) overlay tunnels that "hop-by-hop" between SD-WAN edge routers and intermediate SD-WAN routers that is also known as hierarchical SD-WAN. Some examples of a hierarchical SD-WAN network include hub and spoke topology and a multi-region SD-WAN network that is connected over a common middle mile/core.

In recent years, SD-WAN implementations can support optimized application performance by utilizing application aware routing rather than traditional internet protocol routing based on destination internet protocol lookup. Regarding the first overlay model example utilizing direct connections, implementations can support application aware routing via service level agreement (SLA) measurements on one hop tunnel and then forward application traffic based on the SLA requirements. However, the same solution fails to work when the second overlay model (e.g., hierarchical SD-WAN) is used in SD-WAN, as between any two edge routers, there are multiple tunnels that can be chained together.

As such, a need exists to leverage a network to optimize application performance in a hierarchical software-defined networking in a wide area network.

Figure 3:
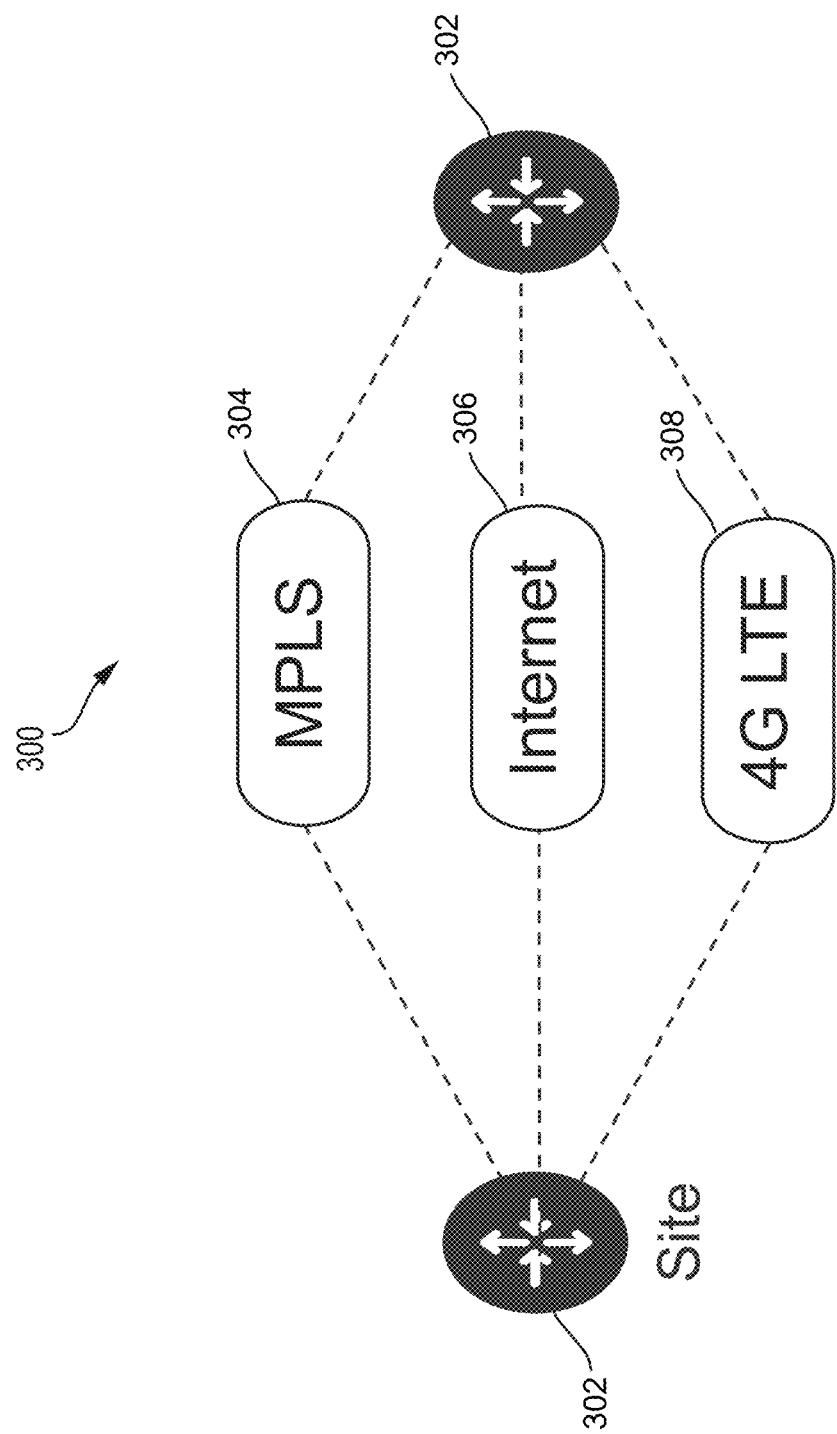
FIG. 3 illustrates an example topology of a flat overlay model for a software-defined networking in a wide area network, in accordance with some embodiments.

FIG. 3 illustrates an example topology of a flat overlay model 300 for a software-defined networking in a wide area network. Flat overlay model 300 can include overlay tunnels 304, 306, 308 that directly connect SD-WAN edge routers/sites 302. Edge routers 302 can be fabric edge nodes 126 as described herein. Moreover, edge routers 302 can be directly connected by overlay tunnels including a multi-protocol label switching (MPLS) transports 304, the Internet 306, and fourth generation long-term evolution ("4G LTE").

Figure 4:
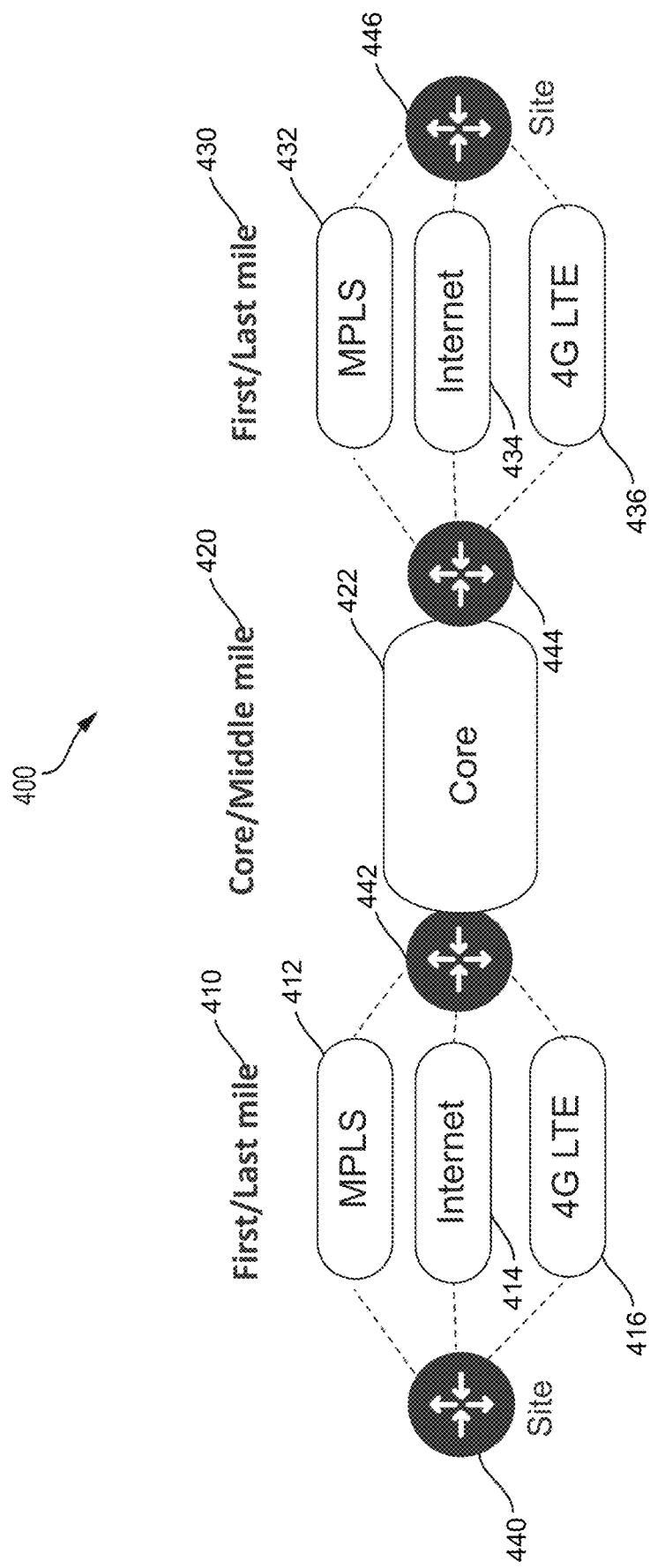
FIG. 4 illustrates an example topology of a hierarchical overlay model for a software-defined networking in a wide area network, in accordance with some embodiments.

FIG. 4 illustrates an example topology of a hierarchical overlay model 400 for a software-defined networking in a wide area network. Hierarchical overlay model 400 can include overlay tunnels 412, 414, 416, 422, 432, 434, 436 that "hop-by-hop" between SD-WAN edge routers 440, 446 and intermediate SD-WAN routers 442, 444. Edge routers 440, 446 can also be fabric edge nodes 126, and intermediate routers 442, 444 can be fabric border nodes 122 or fabric intermediate nodes 124, as described herein. Overlay tunnels (e.g., first/last mile 410, 430) utilized by hierarchical overlay model 400 can include MPLS transports 412, 432, the Internet 414, 434, and 4G LTE 416, 436. Hierarchical overlay model 400 can further include a core 422 during a core/middle mile 420.

In some implementations, hierarchical overlay model 400 can be utilized to decouple transport providers across multiple regions, which provides flexibility in order to build a global SD-WAN, tunnel scale by hierarchy, eliminate complexities of running a regional SD-WAN that is connected via a disjoint border gateway protocol (BGP) core/backbone, increase end-to-end path visibility, and provide hosted services in point-of-presence (POP) including as-a-service.

Hierarchical overlay model 400 can be utilized for an SD-WAN network and be deployed via a collection of regional networks that can be stitched to a common SD-WAN core network. SD-WAN edge routers 440, 446 can then provide connectivity to networks such as customer networks. SD-WAN intermediate routers 442, 444 (e.g., border routers) can provide cross region connectivity to regional networks, thereby forming a hierarchy of networks. IP Security ("IPSec") or generic routing encapsulation (GRE) tunnels can deploy a full mesh between edge routers 440, 446 in a given region and their respective regional border routers 442, 444. Border routers 442, 444 can be fully meshed via IPSec/GRE tunnels in core 422. Core 422 can be a core network that can be built on top of a middle mile provider 420, and a regional network can be built on top of a local service provider 410, 430. Hierarchical overlay model 400 can be utilized to optimize tunnel scale on edge routers 440, 446 and also to decouple regional networks 440 from core network 422 and other regional networks 446. Furthermore, hierarchical overlay model 400 may be necessary when end-to-end tunnels (e.g., directly between edge routers 440, 446 in different regions) are not available due to regions using private networks from local service providers.

Figure 5:
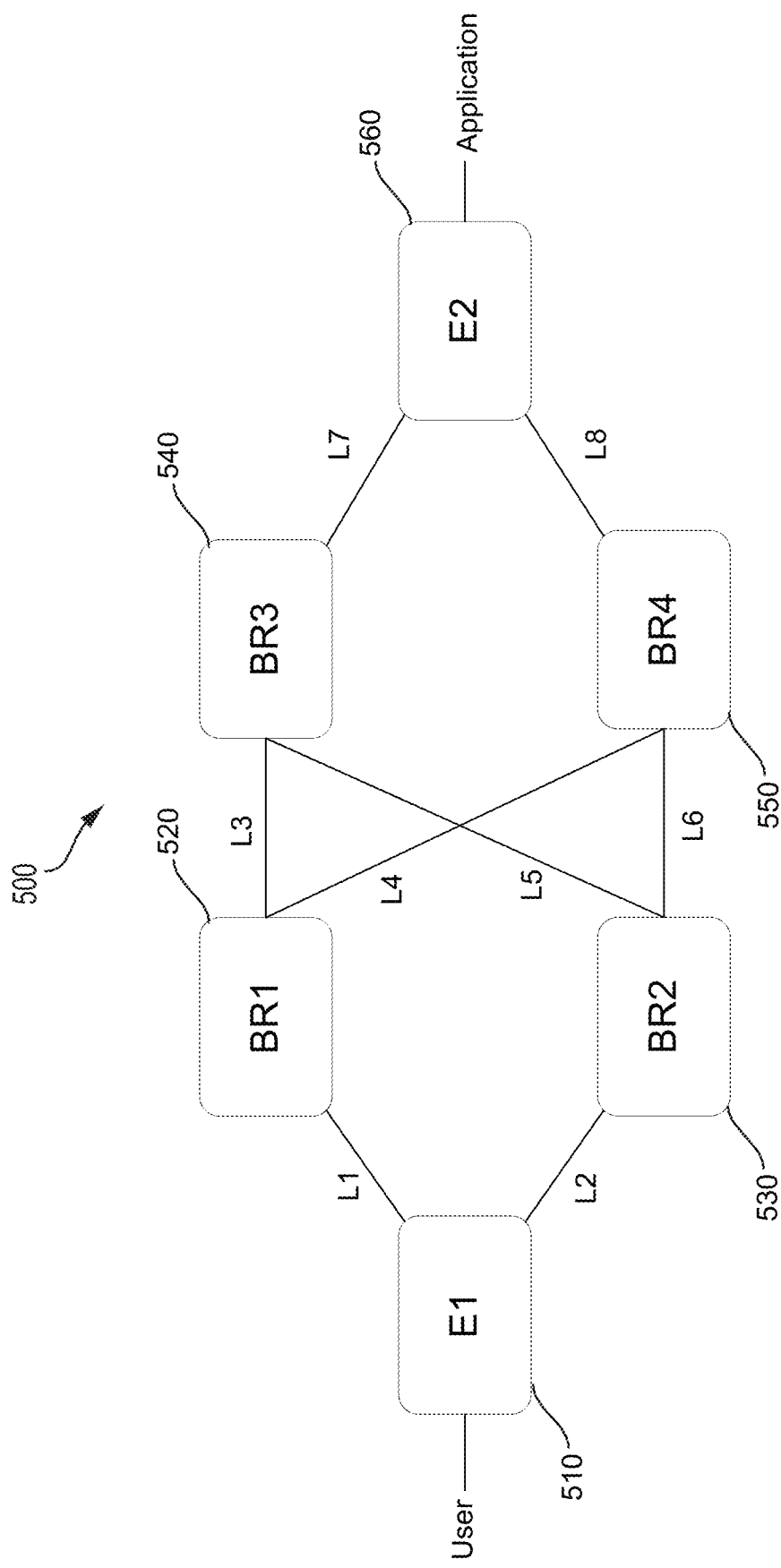
FIG. 5 illustrates an example topology of a hierarchical overlay model for a software-defined networking in a wide area network between a user and an application, in accordance with some embodiments.

FIG. 5 illustrates an example topology of a hierarchical overlay model 500 for a software-defined networking in a wide area network between a user and an application. Hierarchical overlay model 500 can include overlay tunnels L1-L8 that "hop-by-hop" between SD-WAN edge routers (e.g., E1 and E2) 510, 560 and intermediate SD-WAN border routers (e.g., BR1-BR4) 520, 530, 540, 550. Edge routers 510, 560 can also be fabric edge nodes 126, and border routers 520, 530, 540, 550 can be fabric border nodes 122 or fabric intermediate nodes 124, as described herein. Overlay tunnels L1-L8 utilized by hierarchical overlay model 500 can be MPLS transports, the Internet, 4G LTE, or any other transport tunnel suitable for the intended purpose and understood by a person of ordinary skill in the art.

Generally, traditional hierarchical SD-WAN cannot deploy application aware routing processes. For example, referring to FIG. 5, an application flow can be established between users attached to edge router 510 and an application attached to edge router 560. The application flow of hierarchical overlay model 500 can require low latency paths to enable better application experience. However, picking lowest latency tunnel at any hop may not yield the lowest latency total path from user to the application. For example, overlay tunnels L1 and L5-L7 may have low latency links in hierarchical overlay model 500, but the lowest end-to-end latency path may only be possible if traffic flows from edge router 510 to border router 530 via tunnel L2, then to border router 540 via tunnel L5, and then to edge router 560 via tunnel L7. Furthermore, if traffic is sent from edge router 510 to border router 520 via tunnel L1, if tunnel L1 has the lowest latency link between tunnels L1, L2, then any path taken from border router 520 and onwards will yield suboptimal overall latency since the most optimal end-to-end latency path begins with providing traffic through border router 530. As such, a need exists to forward traffic that yields minimal overall latency and not just a hop-by-hop minimal optimization, which can include a resource consuming algorithm as it requires state information for all tunnels in the path.

Figure 6:
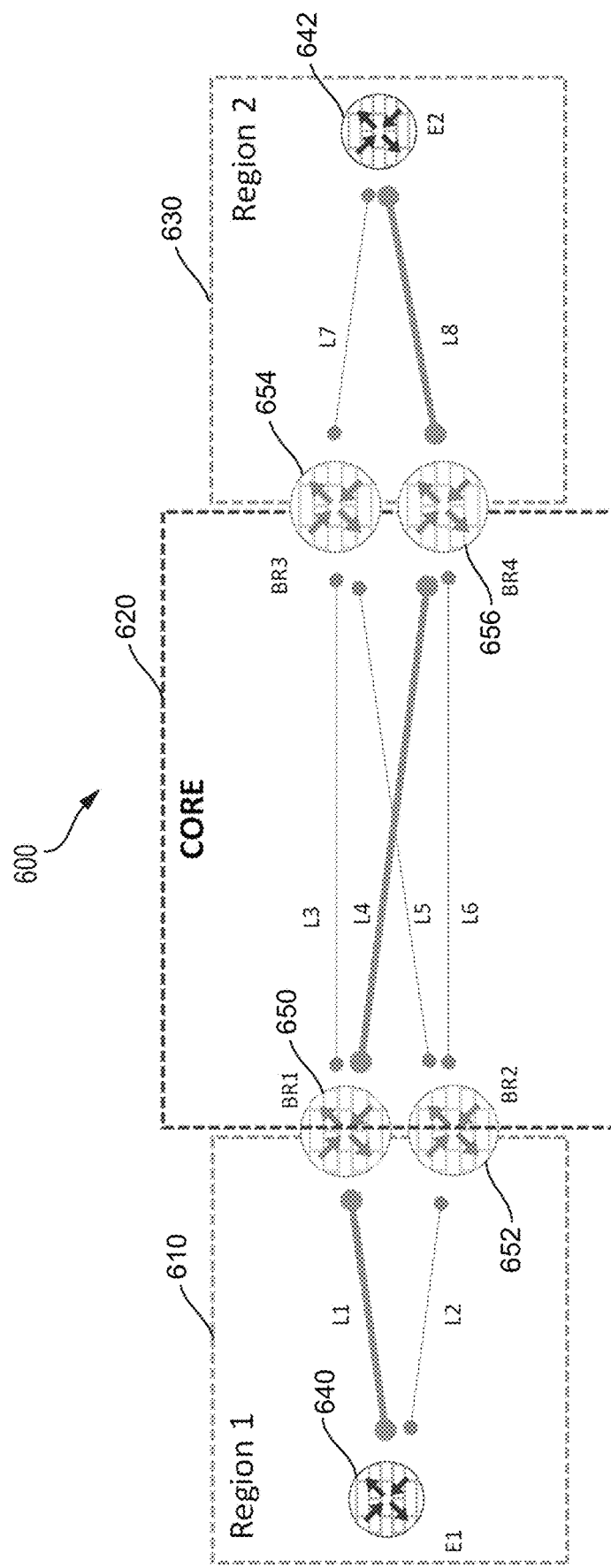
FIG. 6 illustrates an example topology of a hierarchical overlay model utilizing service level agreement aware path computation, in accordance with some embodiments.

FIG. 6 illustrates an example topology of a hierarchical overlay model 600 utilizing service level agreement aware path computation. Hierarchical overlay model 600 can include overlay tunnels L1-L8 between SD-WAN edge routers (e.g., E1 and E2) 640, 642 and intermediate SD-WAN border routers (e.g., BR1-BR4) 650, 652, 654, 656. Edge routers 640, 642 can also be fabric edge nodes 126, and border routers 650, 652, 654, 656 can be fabric border nodes 122 or fabric intermediate nodes 124, as described herein. Overlay tunnels L1-L8 utilized by hierarchical overlay model 600 can be MPLS transports, the Internet, 4G LTE, or any other transport tunnel suitable for the intended purpose and understood by a person of ordinary skill in the art. Furthermore, region 1 610 of hierarchical overlay model 600 can include overlay tunnels L1 and L2, a core region 620 can include overlay tunnels L3-L6, and region 2 630 can include overlay tunnels L7 and L8. Region 1 610, core region 620, and region 2 630 of hierarchical overlay model 600 can be networks. For example, region 1 610 and region 2 630 can be consumer networks, while core region 620 can be a core network.

In some implementations, hierarchical overlay model 600 can include providing optimized end-to-end application aware routing (e.g., service level agreement aware path computation). For example, hierarchical overlay model 600 can include measuring metrics at each router (e.g., edge routers 640, 642 and border routers 650, 652, 654, 656) in networks 610, 620, 630 relating to the corresponding router and/or overlay tunnels L1-L8. Overlay tunnels L1-L8 can include tunnels, links, connections (wired or wireless), pathways, paths, lines, couplings, route, or any other connection suitable for the intended purpose and understood by a person of ordinary skill in the art. In some instances, overlay tunnels L1-L8 can also include utilizing bidirectional forwarding detection (BFD) probes over overlay tunnels L1-L8. In other instances, metrics measured at each router (e.g., edge routers 640, 642 and border routers 650, 652, 654, 656) in networks 610, 620, 630 can include latency, loss, jitter, and maximum transmission unit (MTU).

The routers (e.g., edge routers 640, 642 and border routers 650, 652, 654, 656) of hierarchical overlay model 600 can advertise or provide the measured metrics on a route/link route (e.g., overlay tunnel L1-L8) of a corresponding router (e.g., edge routers 640, 642 and border routers 650, 652, 654, 656). For example, edge router 640 can provide measured metrics (e.g., packet loss, latency, and jitter) of edge router 640 to border router 650 on overlay tunnel L1. In some instances, the link route can identify the corresponding overlay tunnel L1-L8 for which the measurement applies. For example, the link route can include and utilize two transport locators ("TLOC") of the corresponding overlay tunnel L1-L8.

In some instances, the link route of hierarchical overlay model 600 can advertised or provided to other peers (e.g., edge routers 640, 642 and border routers 650, 652, 654, 656) in networks 610, 620, 630. For example, an overlay management protocol (OMP) route can be utilized to advertise the link route to a controller (e.g., vSmart of Cisco®). In some instances, core region of 620 of hierarchical overlay model 600 can include the controller. The controller hierarchical overlay model 600 can then provide the link route to other routers (e.g., edge routers 640, 642 and border routers 650, 652, 654, 656) in networks 610, 620, 630. In instances where an OMP is utilized (unlike interior gateway protocol (IGP) protocols such as open shortest path first (OSPF) and intermediate system to intermediate system (ISIS)), there is relatively no periodic flooding of the link route in the network 610, 620, 630 of hierarchical overlay model 600.

In some implementations, the router (e.g., edge routers 640, 642 and border routers 650, 652, 654, 656) of hierarchical overlay model 600 that is advertising the link route can also allocate a per link multi-protocol label Switching (MPLS) label suitable for the intended purpose and understood by a person of ordinary skill in the art. The advertising router (e.g., edge routers 640, 642 and border routers 650, 652, 654, 656) can then provide the MPLS label along with the link route to a corresponding or designated router (e.g., edge routers 640, 642 and border routers 650, 652, 654, 656) or controller (e.g., vSmart of Cisco®).

In other implementations, routers (e.g., edge routers 640, 642 and border routers 650, 652, 654, 656) of hierarchical overlay model 600 can build or compile a link database from link routes received from other routers (e.g., edge routers 640, 642 and border routers 650, 652, 654, 656) of hierarchical overlay model 600. The link database can include the performance measurements of all of the links that are advertised in the link route. The routers (e.g., edge routers 640, 642 and border routers 650, 652, 654, 656) and/or controller of hierarchical overlay model 600 can also utilize application routing policies that optimize a routing metric such as latency that edge routers 640, 642 can utilize to compute a path from itself to a destination edge router 640, 642. For example, the path computation can be available as edge routers 640, 642 have knowledge of the topology of hierarchical overlay model 600, which can be derived from the link database that also includes individual link characteristics (e.g., packet loss, latency, and jitter) in networks 610, 620, 630.

In some instances, the path computation of hierarchical overlay model 600 determined by routers (e.g., edge routers 640, 642 and border routers 650, 652, 654, 656) and/or controller can provide an ordered set of links (e.g., overlay tunnels L1-L8) that network traffic traverses (and in some instances, required to traverse) to travel from source edge router 640, 642 to the destination edge router 640, 642. For example, the ordered set of links in the path from edge router 640 to edge router 642 can include a sequenced order of links to be traveled such as from overlay tunnels L1 to L4 and then to L8 (e.g., as emphasized in FIG. 6). The ordered set of links may also be based on application requirements such as a low latency requirement.

Once the ordered set of links is determined by routers (e.g., edge routers 640, 642 and border routers 650, 652, 654, 656) and/or controller of hierarchical overlay model 600, network traffic from edge router E1 to edge router E2 (e.g., edge router 640 to edge router 642) can be directed to traverse the overlay tunnels L1-L8 designated in the ordered set of links by imposing MPLS labels that were previously allocated and advertised by corresponding routers (e.g., edge routers 640, 642 and border routers 650, 652, 654, 656). For example, if border router 652 allocated label 500 to overlay tunnel L5 and border router 654 allocated label 700 to overlay tunnel L7, then the packet (e.g., MPLS labels) can be provided with a label stack of [500, 700] to allow it to traverse overlay tunnels L5 and L7. In addition to link labels (e.g., 500 for overlay tunnel L5 and 700 for overlay tunnel L7), edge router 640, 642 can also include/impose a VPN label 712 for segmentation in the packet/MPLS labels as shown and described in FIG. 7.

Figure 7:
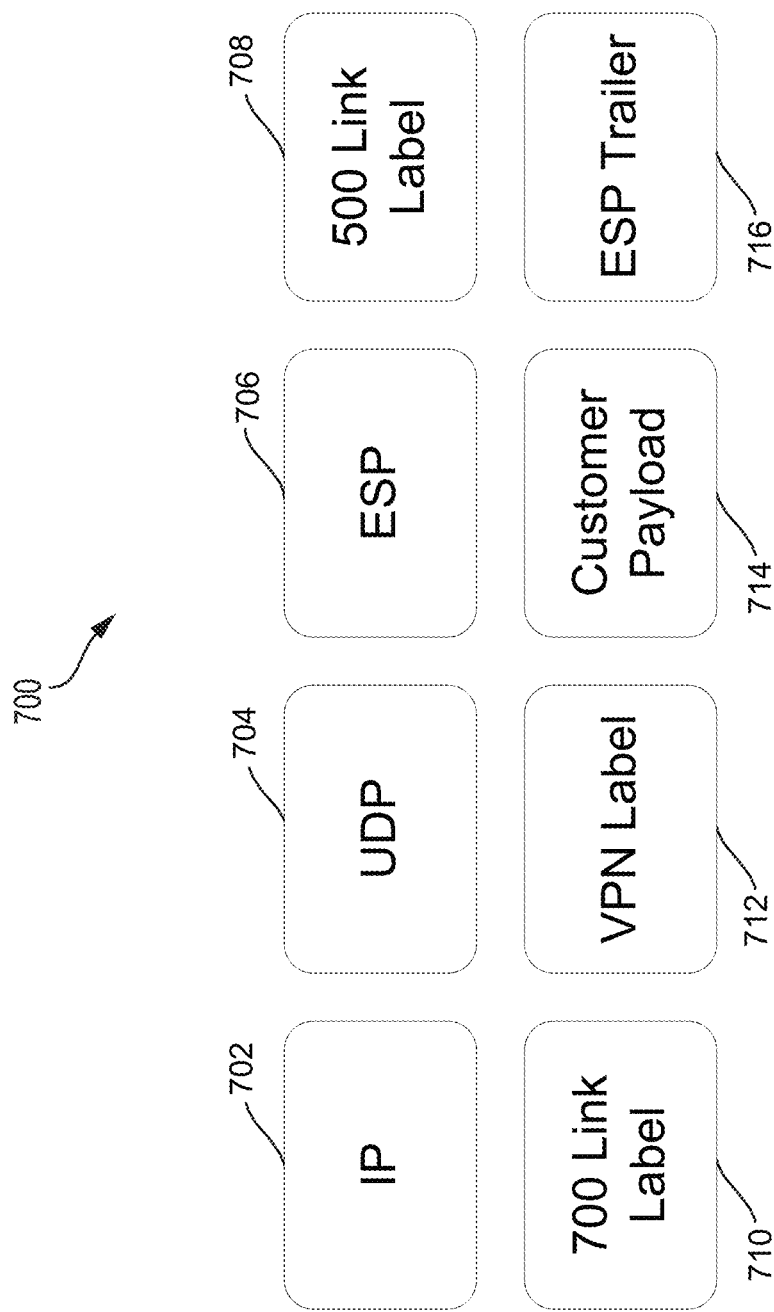
FIG. 7 illustrates an example packet format utilized in a hierarchical overlay model for a software-defined networking in a wide area network, in accordance with some embodiments.

FIG. 7 illustrates an example packet 700 format utilized in a hierarchical overlay model for a software-defined networking in a wide area network. For example, packet 700 can include an IP 702 (e.g., outer destination IP and/or source IP), a user datagram protocol (UDP) 704, an encapsulating security payload (ESP) 706, a first link label 708 (e.g., 500 link label), a second link label 710 (e.g., 700 link label), a virtual private network (VPN) label 712, a customer payload 714, an ESP trailer 716, and any other header or information suitable for the intended purpose and understood by a person of ordinary skill in the art.

In other implementations, hierarchical overlay model 600 can further include computing paths to prefix ("pfx") via edge routers 640, 642 with SLA constraints by utilizing control planes and data planes. For example, edge router E1 640 can determine paths to prefix pfx via edge router E2 642 with SLA constraints (e.g., Path 1: edge router E1 640→overlay tunnel L2→border router BR2 652→overlay tunnel L5→border router BR3 654→overlay tunnel L7→edge router E2 642). Edge router E1 640 can also impose a label stack (e.g., Path 1: [500, 700, VPN label]). In some instances, hierarchical overlay model 600 can allocate a label to each overlay tunnel L1-L8. For example, overlay tunnel L1 can be allocated label 100, overlay tunnel L2 can be allocated label 200, overlay tunnel L3 can be allocated label 300, overlay tunnel L4 can be allocated label 400, overlay tunnel L5 can be allocated label 500, overlay tunnel L6 can be allocated label 600, overlay tunnel L7 can be allocated label 700, and overlay tunnel L8 can be allocated label 800.

In some instances, hierarchical overlay model 600 can include directing traffic from edge router E1 640 (e.g., a user) to edge router E2 642 (e.g., an application). For example, traffic including prefix pfx can be directed from edge router E1 640 towards edge router E2 642 via overlay tunnel L2 (by way of border router 652) with labels (500, 700, VPN label) imposed on the packets. Edge router 640 can provide direct traffic to border router 652 via overlay tunnel L2. In this instance, an outer destination IP can be an IP address of border router 652 and a source IP can be an IP address of edge router E1 640.

As traffic arrives at border router 652, the outer destination IP is itself. As such, the outer header can be removed. The top of the stack label 500 lookup 708 can indicate that packet 700 is to be provided by overlay tunnel L5. Border router 652 can then encapsulate the traffic received from edge router E1 640, establish the outer destination IP to be an IP address of border router 654, and establish the source IP to be the IP address of border router 652. Thereafter, label 500 can be removed and traffic can be sent with label stack (700, VPN label).

As traffic arrives at border router 654, the outer destination IP is itself. As such, the outer header can be removed. The top of the stack label 700 lookup 710 can indicate that packet 700 is to be provided by overlay tunnel L7. Border router 654 can then encapsulate the traffic received from border router 652, establish the outer destination IP to be an IP of edge router E2 642, and establish the source IP to be the IP address of border router 654. Thereafter, label 700 can be removed and traffic can be sent with label stack (VPN label).

As traffic arrives at edge router E2 642, the outer destination IP is itself. As such, the outer header can be removed, leaving the VPN label in the label stack, which can be utilized to determine the VPN forwarding table. An IP lookup in the VPN forwarding table can provide a local area network (LAN) side interface and direct the traffic to the application at edge router E2 642.

In other instances, hierarchical overlay model 600 can include a service level agreement-aware path computation. For example, tunnel SLA measurements can include L1 SLA: loss 2%, latency 100 msecs; L2 SLA: loss 7%, latency 70 msecs; L3 SLA: loss 0%, latency 90 msecs; L4 SLA: loss 3%, latency 20 msecs; L5 SLA: loss 0%, latency 120 msecs; L6 SLA: 5%, latency 80 msecs; L7 SLA: loss 0%, latency 50 msecs; and L8 SLA: loss 0%, latency 170 msecs. Hierarchical overlay model 600 can then compute a path to a destination edge router 640, 642 with an SLA constraint. For example, an application from edge router E1 640 to edge router E2 642 may require a latency less than 250 msecs and a loss of less than 5%. In such an instance, path L1→L4→L8 would meet the requirements of the SLA constraint. In some instances, source routing can be utilized from edge router E1 640 to force traffic along selected path L1→L4→L8. Path selection can also be determined by routers (e.g., edge routers 640, 642 and border routers 650, 652, 654, 656) or controllers of hierarchical overlay model 600.

In other implementations, different metrics can be ascertained end-to-end in hierarchical overlay model 600. For example, latency as an example of a metric utilized by hierarchical overlay model 600. However, other metrics can also be utilized by hierarchical overlay model 600 such as loss, jitter, and MTU compute paths that optimize the specified metric. In some instances, SD-WAN routers (e.g., edge routers 640, 642 and border routers 650, 652, 654, 656) can advertise (e.g., in a scalable manner by not resorting to periodic IGP-like flooding) tunnel reachability and its characteristics, and utilize this information to compute paths that optimize constraint to obtain better application performance. Moreover, leverage hop-by-hop SLA/MTU measurements can be utilized to compute end-to-end optimal paths without having to build flat tunnels from every edge router to every other edge router in the network, thereby running SLA measurements over them.

Figure 8:
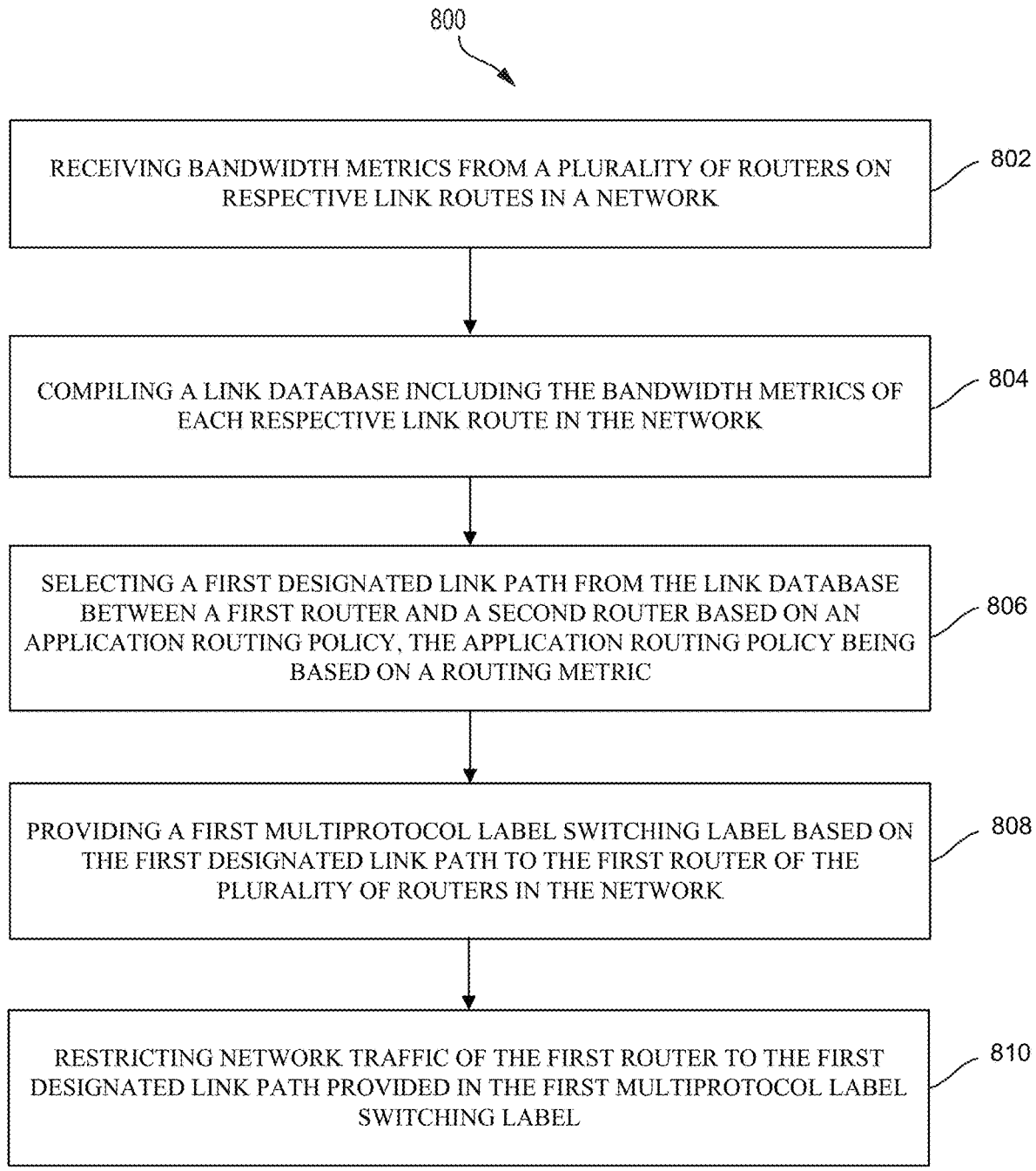
FIG. 8 illustrates an example process for optimizing application performance in a hierarchical software-defined networking in a wide area network, in accordance with some embodiments.

Having disclosed some example system components and concepts, the disclosure now turns to FIG. 8, which illustrate example method 800 for optimizing application performance in a hierarchical software-defined networking in a wide area network. The steps outlined herein are exemplary and can be implemented in any combination thereof, including combinations that exclude, add, or modify certain steps.

At step 802, the method 800 can include receiving bandwidth metrics from a plurality of routers on respective link routes in a network. The bandwidth metrics received from the plurality of routers can include at least one of latency, loss, jitter, and maximum transmission unit. Each respective link route can be between a set of routers of the network, the set of routers including an edge router and a border router.

At step 804, the method 800 can include compiling a link database including the bandwidth metrics of each respective link route in the network.

At step 806, the method 800 can include selecting a first designated link path from the link database between a first router and a second router based on an application routing policy, the application routing policy being based on a routing metric. The method 800 can further include selecting an ordered set of links between at least two routers such that a link path including the routers optimizes the metrics that satisfy application requirements. The routing metric can include packet loss, latency, and/or jitter of the respective link routes in the network. The selecting of the first designated link path from the link database between the first router and the second router can be performed by an edge router of the network.

At step 808, the method 800 can include providing a first multiprotocol label switching label based on the first designated link path to the first router of the plurality of routers in the network. The method 800 can further include providing a multiprotocol label switching stack that corresponds to the ordered set of links between the at least two routers. The first multiprotocol label switching label can include a link label and a virtual private network label for segmentation. The multiprotocol label switching labels for each link can be derived from the link database compiled by the method 800.

At step 810, the method 800 can include restricting network traffic of the first router to the first designated link path provided in the first multiprotocol label switching label.

The method of 800 can further include providing the first multiprotocol label switching label to the plurality of routers in the network to facilitate the restricting of the network traffic of the first router to the first designated link path.

Figure 9:
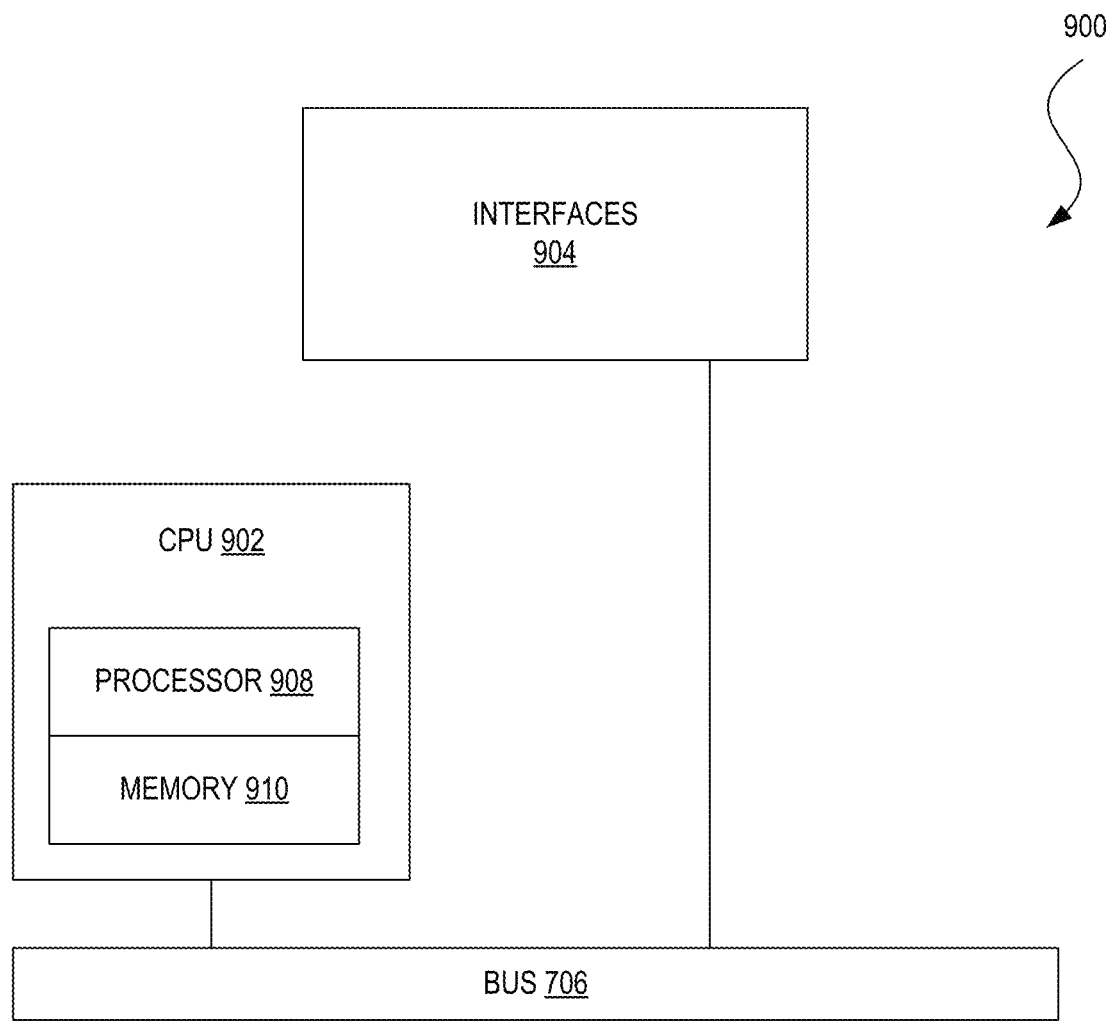
FIG. 9 illustrates an example of a network device, in accordance with some embodiments.

FIG. 9 further illustrates an example of a network device 900 (e.g., switch, router, network appliance, etc.). The network device 900 can include a master central processing unit (CPU) 902, interfaces 904, and a bus 906 (e.g., a PCI bus). When acting under the control of appropriate software or firmware, the CPU 902 can be responsible for executing packet management, error detection, and/or routing functions. The CPU 902 preferably accomplishes all these functions under the control of software including an operating system and any appropriate applications software. The CPU 902 may include one or more processors 908 such as a processor from the Motorola family of microprocessors or the MIPS family of microprocessors. In an alternative embodiment, the processor 908 can be specially designed hardware for controlling the operations of the network device 900. In an embodiment, a memory 910 (such as non-volatile RAM and/or ROM) can also form part of the CPU 902. However, there are many different ways in which memory could be coupled to the system.

An enterprise network can address the above and other security requirements with certain enhancements. For example, the enterprise network can create an International Mobile Subscriber Identity (IMSI) whitelist in in an Authentication, Authorization, and Accounting (AAA) server. In addition to SIM authentication, the enterprise network can maintain the AAA server containing the IMSIs of enterprise-provisioned devices. After initial authentication, a Packet Data Network Gateway (PGW) can validate the IMSI with the local device. The enterprise can also create a mapping of IMSIs to International Mobile Equipment Identities (IMEIs) for (non-embedded) SIM cards. The cloud-hosted authentication system can maintain a mapping between IMSIs and IMEIs. This mapping can be controlled by the enterprise network. This can ensure a binding between device and SIM. After authentication, the mobile core can request the IMEI. It can further check if the IMEI maps to IMSI. The enterprise network can also deploy Virtual Routing and Forwarding (VRFs) instances based on device policy. The PGW can tunnel user traffic to specific VRFs.

The interfaces 904 can be provided as interface cards (sometimes referred to as line cards). The interfaces 904 can control the sending and receiving of data packets over the network and sometimes support other peripherals used with the network device 900. Among the interfaces that may be provided are Ethernet interfaces, frame relay interfaces, cable interfaces, Digital Subscriber Line (DSL) interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 904 may include ports appropriate for communication with the appropriate media. In some cases, the interfaces 904 may also include an independent processor and, in some instances, volatile RAM. The independent processors may control communication intensive tasks such as packet switching, media control, and management. By providing separate processors for the communication intensive tasks, the interfaces 904 may allow the CPU 902 to efficiently perform routing computations, network diagnostics, security functions, and so forth.

Although the system shown in FIG. 9 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 900.

Regardless of the network device's configuration, it may employ one or more memories or memory modules (including the memory 910) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 10A:
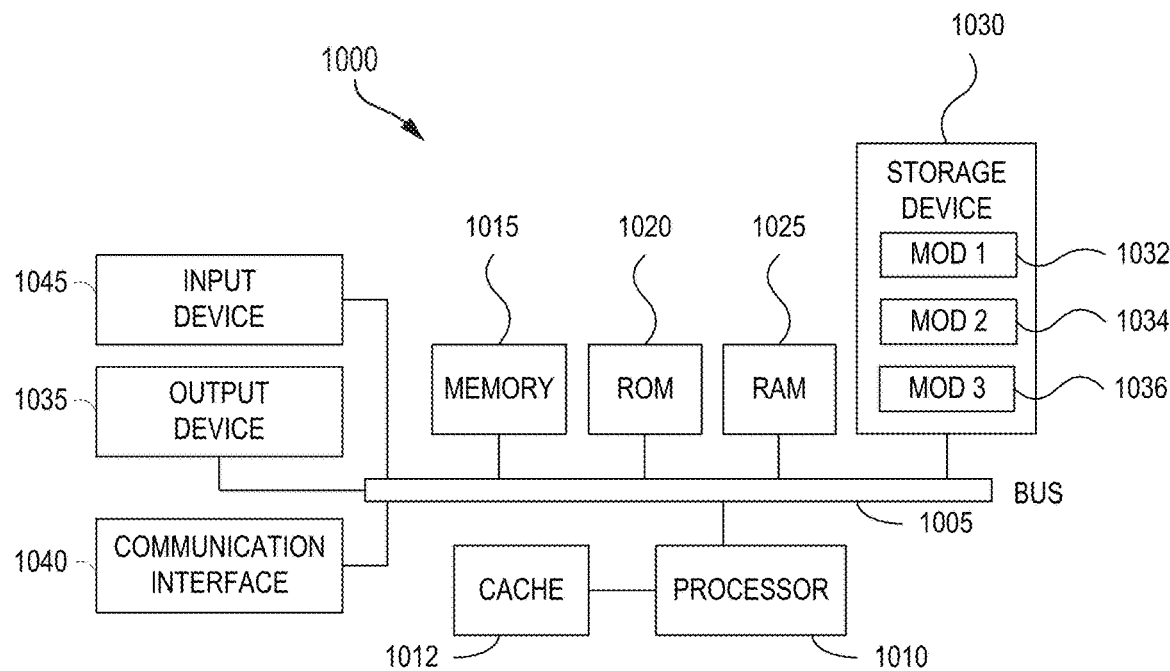
FIGS. 10A and 10B illustrate examples of systems, in accordance with some embodiments.
Figure 10B:
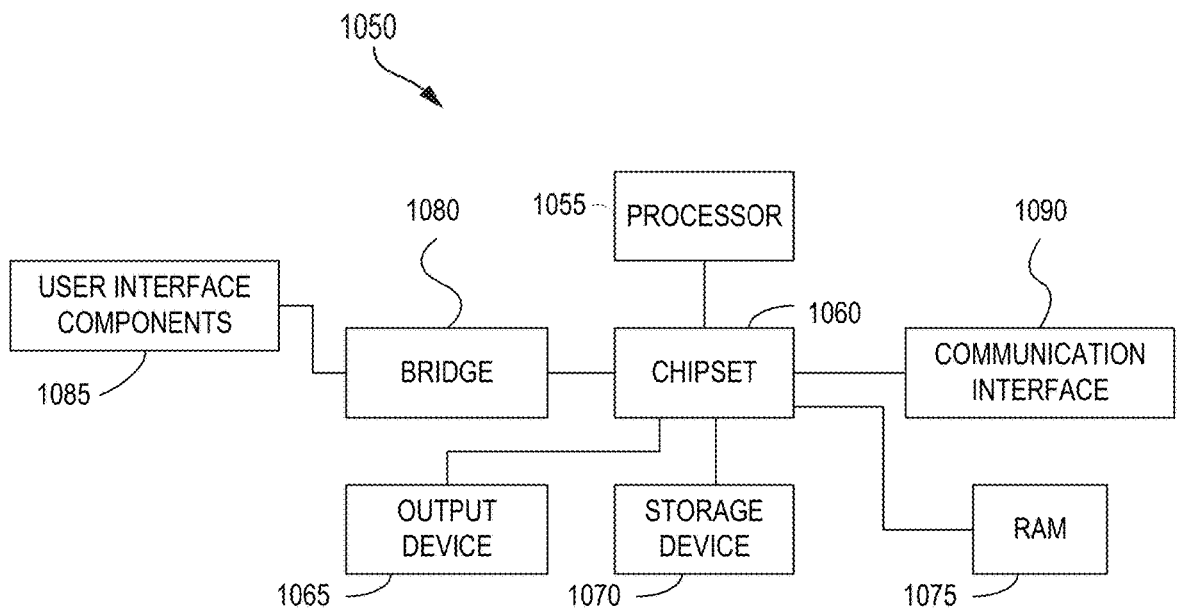

FIGS. 10A and 10B illustrate systems in accordance with various embodiments. The more appropriate system will be apparent to those of ordinary skill in the art when practicing the various embodiments. Persons of ordinary skill in the art will also readily appreciate that other systems are possible.

FIG. 10A illustrates an example of a bus computing system 1000 wherein the components of the system are in electrical communication with each other using a bus 1005. The computing system 1000 can include a processing unit (CPU or processor) 1010 and a system bus 1005 that may couple various system components including the system memory 1015, such as read only memory (ROM) 1020 and random access memory (RAM) 1025, to the processor 1010. The computing system 1000 can include a cache 1012 of high-speed memory connected directly with, in close proximity to, or integrated as part of the processor 1010. The computing system 1000 can copy data from the memory 1015, ROM 1020, RAM 1025, and/or storage device 1030 to the cache 1012 for quick access by the processor 1010. In this way, the cache 1012 can provide a performance boost that avoids processor delays while waiting for data. These and other modules can control the processor 1010 to perform various actions. Other system memory 1015 may be available for use as well. The memory 1015 can include multiple different types of memory with different performance characteristics. The processor 1010 can include any general purpose processor and a hardware module or software module, such as module 1 1032, module 2 1034, and module 3 1036 stored in the storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction with the computing system 1000, an input device 1045 can represent any number of input mechanisms, such as a microphone for speech, a touch-protected screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing system 1000. The communications interface 1040 can govern and manage the user input and system output. There may be no restriction on operating on any particular hardware arrangement and therefore the basic features here may easily be substituted for improved hardware or firmware arrangements as they are developed.

The storage device 1030 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 1030 can include the software modules 1032, 1034, 1036 for controlling the processor 1010. Other hardware or software modules are contemplated. The storage device 1030 can be connected to the system bus 1005. In some embodiments, a hardware module that performs a particular function can include a software component stored in a computer-readable medium in connection with the necessary hardware components, such as the processor 1010, bus 1005, output device 1035, and so forth, to carry out the function.

FIG. 10B illustrates an example architecture for a chipset computing system 1050 that can be used in accordance with an embodiment. The computing system 1050 can include a processor 1055, representative of any number of physically and/or logically distinct resources capable of executing software, firmware, and hardware configured to perform identified computations. The processor 1055 can communicate with a chipset 1060 that can control input to and output from the processor 1055. In this example, the chipset 1060 can output information to an output device 1065, such as a display, and can read and write information to storage device 1070, which can include magnetic media, solid state media, and other suitable storage media. The chipset 1060 can also read data from and write data to RAM 1075. A bridge 1080 for interfacing with a variety of user interface components 1085 can be provided for interfacing with the chipset 1060. The user interface components 1085 can include a keyboard, a microphone, touch detection and processing circuitry, a pointing device, such as a mouse, and so on. Inputs to the computing system 1050 can come from any of a variety of sources, machine generated and/or human generated.

The chipset 1060 can also interface with one or more communication interfaces 1090 that can have different physical interfaces. The communication interfaces 1090 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 1055 analyzing data stored in the storage device 1070 or the RAM 1075. Further, the computing system 1050 can receive inputs from a user via the user interface components 1085 and execute appropriate functions, such as browsing functions by interpreting these inputs using the processor 1055.

It will be appreciated that computing systems 1000 and 1050 can have more than one processor 1010 and 1055, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:
receiving bandwidth metrics from a plurality of routers on respective link routes between a source router and a destination router in a network;
compiling a link database including the bandwidth metrics of each respective link between a first router and a second router in the network;
distributing the link database to each of the plurality of routers, individually, in the network;
at the source router within the plurality of routers, selecting a first designated link path from the link database between the source router and the destination router based on an application routing policy and one or more links within the link database, the application routing policy being based on a routing metric;
generating the first designated link path as an overlay management protocol (OMP) route;
preventing periodic flooding of the first designated link path in the network by advertising the OMP route to a controller, the controller sending the first designated link path to all routers of the plurality of routers;
providing a first multiprotocol label switching label based on the first designated link path to the source router of the plurality of routers in the network; and
generating source routing while preventing periodic flooding in the network by restricting network traffic of the source router to the first designated link path provided in the first multiprotocol label switching label.

2. The computer-implemented method of claim 1, wherein the bandwidth metrics received from the plurality of routers include at least one of latency, loss, jitter, and maximum transmission unit.

3. The computer-implemented method of claim 1, wherein the first multiprotocol label switching label includes a link label and a virtual private network label for segmentation.

4. The computer-implemented method of claim 1, wherein each respective link route is between a set of routers of the network, the set of routers including an edge router and a border router.

5. The computer-implemented method of claim 1, wherein the routing metric includes latency of the respective link routes in the network.

6. The computer-implemented method of claim 1, further comprising providing the first multiprotocol label switching label to the plurality of routers in the network to facilitate the restricting of the network traffic of the source router to the first designated link path.

7. The computer-implemented method of claim 1, wherein the selecting of the first designated link path from the link database between a first router and a second router is performed by an edge router of the network.

8. A system comprising:
one or more processors; and
at least one computer-readable storage medium having stored therein instructions which, when executed by the one or more processors, cause the system to:
receive bandwidth metrics from a plurality of routers on respective link routes between a source router and a destination router in a network;
compile a link database including the bandwidth metrics of each respective link between a first router and a second router in the network;
distribute the link database to each of the plurality of routers, individually, in the network;
at the source router within the plurality of routers, select a first designated link path from the link database between the source router and the destination router based on an application routing policy and one or more links within the link database, the application routing policy being based on a routing metric;
generate the first designated link path as an overlay management protocol (OMP) route;
prevent periodic flooding of the first designated link path in the network by advertising the OMP route to a controller, the controller sending the first designated link path to all routers of the plurality of routers;
provide a first multiprotocol label switching label based on the first designated link path to the source router of the plurality of routers in the network; and
generate source routing while preventing periodic flooding in the network by restricting network traffic of the source router to the first designated link path provided in the first multiprotocol label switching label.

9. The system of claim 8, wherein the bandwidth metrics received from the plurality of routers include at least one of latency, loss, jitter, and maximum transmission unit.

10. The system of claim 8, wherein the first multiprotocol label switching label includes a link label and a virtual private network label for segmentation.

11. The system of claim 8, wherein each respective link route is between a set of routers of the network, the set of routers including an edge router and a border router.

12. The system of claim 8, wherein the routing metric includes latency of the respective link routes in the network.

13. The system of claim 8, wherein the instructions which, when executed by the one or more processors, cause the system to provide the first multiprotocol label switching label to the plurality of routers in the network to facilitate the restriction of the network traffic of the source router to the first designated link path.

14. The system of claim 8, wherein the selection of the first designated link path from the link database between a first router and a second router is performed by an edge router of the network.

15. A non-transitory computer-readable storage medium comprising:
instructions stored on the non-transitory computer-readable storage medium, the instructions, when executed by one or more processors, cause the one or more processors to:
receive bandwidth metrics from a plurality of routers on respective link routes between a source router and a destination router in a network;
compile a link database including the bandwidth metrics of each respective link between a first router and a second router in the network;
distribute the link database to each of the plurality of routers, individually, in the network;
at the source router within the plurality of routers, select a first designated link path from the link database between the source router and the destination router based on an application routing policy and one or more links within the link database, the application routing policy being based on a routing metric;
generate the first designated link path as an overlay management protocol (OMP) route;
prevent periodic flooding of the first designated link path in the network by advertising the OMP route to a controller, the controller sending the first designated link path to all routers of the plurality of routers;
provide a first multiprotocol label switching label based on the first designated link path to the source router of the plurality of routers in the network; and
generate source routing while preventing periodic flooding in the network by restricting network traffic of the source router to the first designated link path provided in the first multiprotocol label switching label.

16. The non-transitory computer-readable storage medium of claim 15, wherein the bandwidth metrics received from the plurality of routers include at least one of latency, loss, jitter, and maximum transmission unit.

17. The non-transitory computer-readable storage medium of claim 15, wherein the first multiprotocol label switching label includes a link label and a virtual private network label for segmentation.

18. The non-transitory computer-readable storage medium of claim 15, wherein the routing metric includes latency of the respective link routes in the network.

19. The non-transitory computer-readable storage medium of claim 15, wherein the instructions, when executed by the one or more processors, cause the one or more processors to provide the first multiprotocol label switching label to the plurality of routers in the network to facilitate the restriction of the network traffic of the source router to the first designated link path.

20. The non-transitory computer-readable storage medium of claim 15, wherein the selection of the first designated link path from the link database between a first router and a second router is performed by an edge router of the network.

\* \* \* \* \*